United States Patent
Bodtker

(10) Patent No.: US 7,806,619 B2
(45) Date of Patent: Oct. 5, 2010

(54) SHAFT ASSEMBLY WITH LASH FREE BIPOT JOINT CONNECTION

(75) Inventor: Joen C. Bodtker, Flint, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 88 days.

(21) Appl. No.: 11/906,487

(22) Filed: Oct. 2, 2007

(65) Prior Publication Data

US 2009/0087254 A1    Apr. 2, 2009

(51) Int. Cl.
    *F16C 11/00*    (2006.01)
(52) U.S. Cl. .................... 403/53; 403/121; 403/162; 411/112
(58) Field of Classification Search .......... 403/53, 403/121, 146, 161, 162, 113, 114, 116; 464/112, 464/132; 411/517, 544
    See application file for complete search history.

(56) References Cited

U.S. PATENT DOCUMENTS

| | | | |
|---|---|---|---|
| 1,232,600 A * | 7/1917 | Peck ........................... 464/112 |
| 2,104,101 A * | 1/1938 | Rosenbaum ................. 464/112 |
| 2,402,238 A * | 6/1946 | Carpenter ................... 175/256 |
| 2,997,864 A * | 8/1961 | Rueb ........................... 464/112 |
| 3,176,805 A * | 4/1965 | Gandy .......................... 403/57 |
| 4,051,924 A * | 10/1977 | Yoshigai ..................... 403/123 |
| 4,135,372 A | 1/1979 | Benson |
| 4,272,972 A | 6/1981 | James |
| 4,333,360 A * | 6/1982 | Simmons ..................... 403/114 |
| 4,560,368 A | 12/1985 | Sherman, II et al. |
| 4,611,692 A * | 9/1986 | Everett ....................... 188/73.1 |
| 5,551,919 A | 9/1996 | Cherpician |
| 6,203,038 B1 | 3/2001 | Bernhard |
| 6,293,167 B1 * | 9/2001 | Latz et al. ................... 73/31.06 |
| 6,325,724 B1 | 12/2001 | Sato et al. |
| 6,460,633 B1 * | 10/2002 | Driver .......................... 175/73 |
| 6,957,595 B2 | 10/2005 | Kromer et al. |
| 7,069,809 B2 | 7/2006 | Sato et al. |
| 7,152,545 B2 | 12/2006 | Sasayama et al. |
| 2001/0042419 A1 | 11/2001 | Latz et al. |
| 2004/0152523 A1 * | 8/2004 | Lai ............................. 464/112 |

FOREIGN PATENT DOCUMENTS

GB    2 097 504    * 11/1982

\* cited by examiner

*Primary Examiner*—Michael P Ferguson
(74) *Attorney, Agent, or Firm*—Cantor Colburn LLP

(57) ABSTRACT

A shaft assembly having a first shaft and a second shaft interconnected by a bipot joint is disclosed. The first shaft and the second shaft are disposed in overlapping spaced relationship. The bipot joint includes a pivot block sandwiched between the first shaft and the second shaft. The pivot defines a mounting surface abutting one of the first and second shafts, and a semi-annular surface opposing the mounting surface and abutting the other of the first shaft and the second shaft. A fastener extends through a bore defined by the first shaft, the pivot block and the second shaft to interconnect the first shaft, the pivot block and the second shaft. The fastener includes a spring to bias the first shaft, the pivot block and the second shaft together, thereby de-lashing the bipot joint.

13 Claims, 2 Drawing Sheets

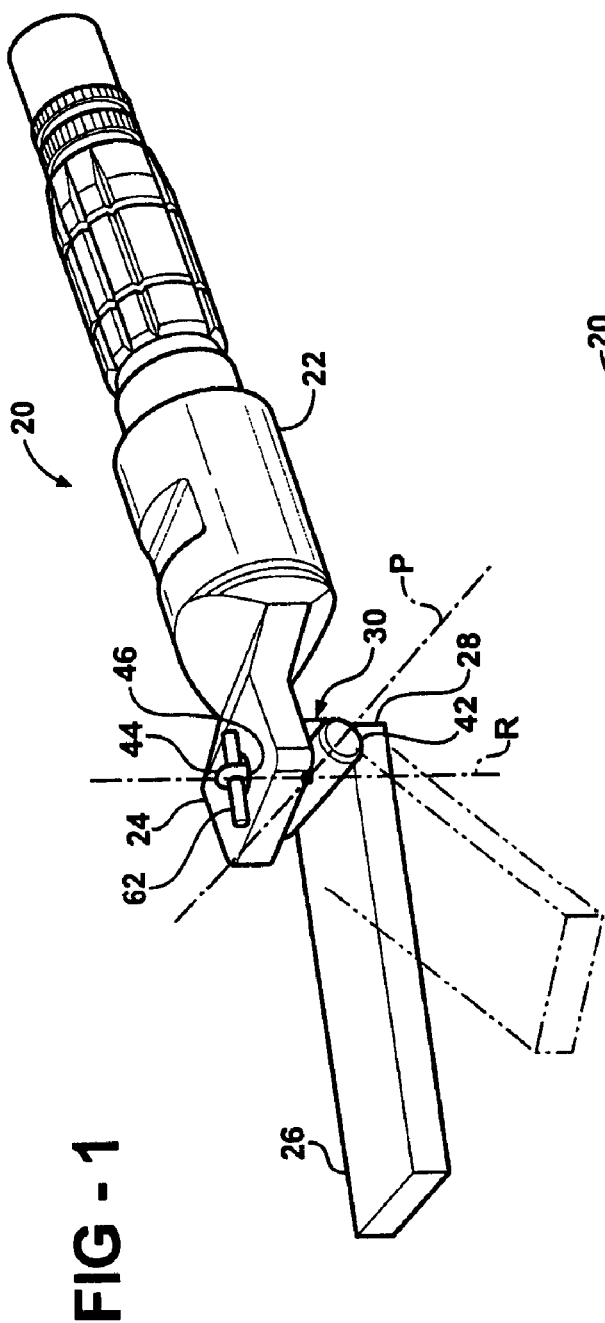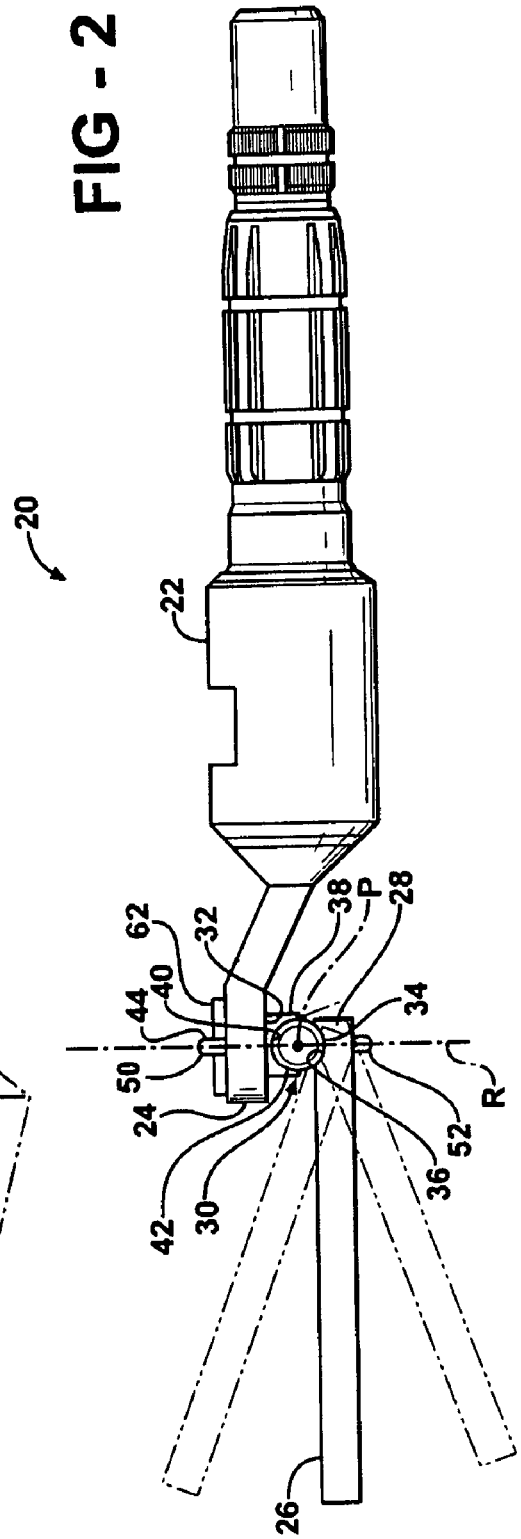

SHAFT ASSEMBLY WITH LASH FREE BIPOT JOINT CONNECTION

BACKGROUND OF THE INVENTION

1. Field of the Invention

The subject invention relates to a shaft assembly, and more specifically to a bipot joint interconnecting a first shaft and a second shaft.

2. Description of the Prior Art

Steering shaft assemblies transmit the movement of a steering wheel through an indirect path to a steering gear. The shaft assemblies typically include at least a first shaft and a second shaft, connected by cardan joint, i.e., a universal joint. Cardan joints permit pivoting movement around a single point in space about two mutually perpendicular axis' that are also mutually perpendicular to a spin axis of the shaft at a 0° joint angle. It is desirable for the shaft assembly to maintain a high torsional stiffness, while keeping frictional loss to a minimum. In order to maintain the high torsional stiffness, the cardan joint must be de-lashed, i.e., remove the slack from the joint. Because most cardan joints utilized in the steering shaft assemblies are constructed using multiple pivot pins, the common solution has been to increase the precision of the parts, which drives up the cost to manufacture the shaft assembly.

A bipot joint utilizes a single pin to achieve the same relative movement between the first shaft and the second shaft as that of the Cardan joints. Typically, the bipot joint includes forming a cross-cut slot into the first shaft, and coupling a T-pin to the second shaft, with the transversely extending leg of the T-pin extending through the cross-cut slot to connect the first shaft and the second shaft. Accordingly, the second shaft is free to rotate about the T-pin axis and the first shaft is free to rotate around the perpendicular axis defined by the transversely extending leg of the T-pin, via the T-pin's freedom to slide on a surface of the first shaft. Like the Cardan style joint, the bipot joint must also be de-lashed, which increases the friction present within the bipot joint. Additionally, the bipot joint as described above is prone to wear.

SUMMARY OF THE INVENTION AND ADVANTAGES

The subject invention provides a shaft assembly. The shaft assembly comprises a first shaft having an output end. A second shaft having an input end partially overlaps the output end of the first shaft. A pivot block is disposed between the output end of the first shaft and the input end of the second shaft. The pivot block defines a pivot axis about which the first shaft and the second shaft pivot relative to each other. A fastener interconnects the output end, the pivot block and the input end. The fastener defines a rotational axis, which is transverse to the pivot axis. The first shaft and the second shaft rotate relative to each other about the rotational axis.

The pivot block includes a mounting surface disposed against one of the output end and the input end, and further includes a semi-annular surface. The semi-annular surface opposes the mounting surface, and is disposed against the other of the input end and the output end. The semi-annular surface facilitates the pivotal movement of the first shaft relative to the second shaft.

Accordingly, the subject invention provides a shaft assembly having a bipot joint interconnecting the first shaft and the second shaft, which eliminates the lash in the bipot joint by assembling the bi-pot joint sandwich style. This simplified form of assembly does not require the high precision previously required in other types of universal joints utilized in steering shaft assemblies, thereby reducing the manufacturing costs of the steering shaft assemblies.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a perspective view of a first embodiment of a shaft assembly;

FIG. 2 is a side view of the first embodiment of the shaft assembly;

DETAILED DESCRIPTION OF THE INVENTION

Referring to the Figures, wherein like numerals indicate corresponding parts throughout the several views, a shaft assembly is generally shown at 20. The shaft assembly 20 shown in the Figures is embodied as a steering shaft system for a vehicle. The steering shaft system is for transmitting rotational inputs from a steering wheel to a steering gear through an indirect path. It should be appreciated, however, that the subject invention may be configured for any number of uses, and is not limited to the steering shaft shown in the Figures.

Figure 3:
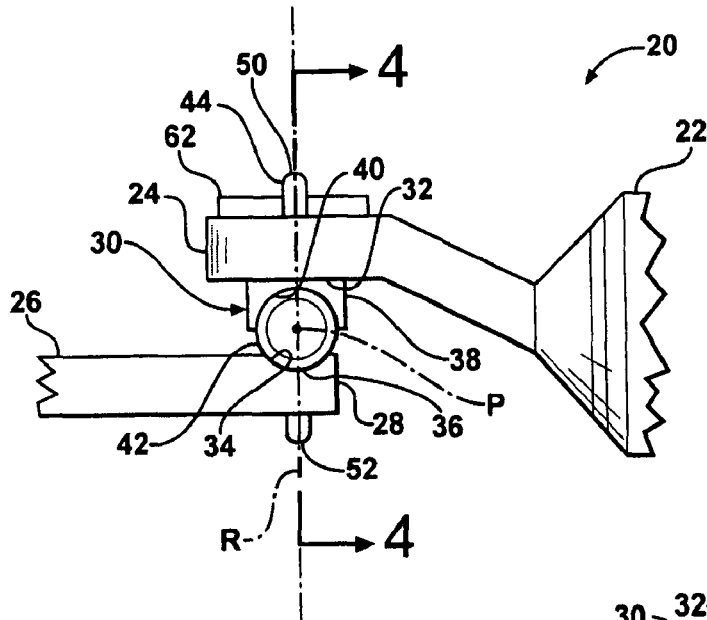
FIG. 3 is an enlarged fragmentary side view of the first embodiment of the shaft assembly.
Figure 4:
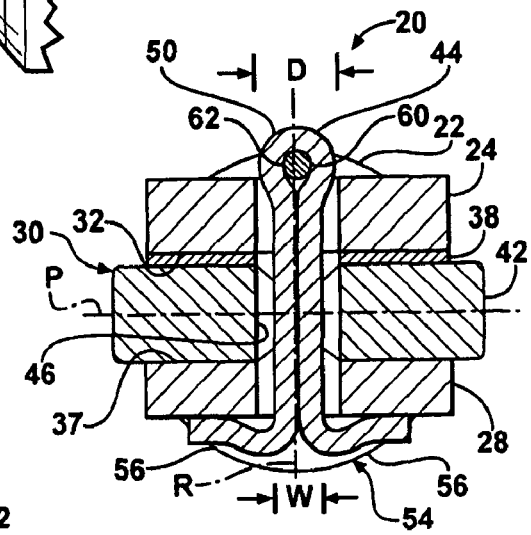
FIG. 4 is a cross sectional view of the first embodiment of the shaft assembly along cut line 4-4 shown in FIG. 3.
Figure 6:
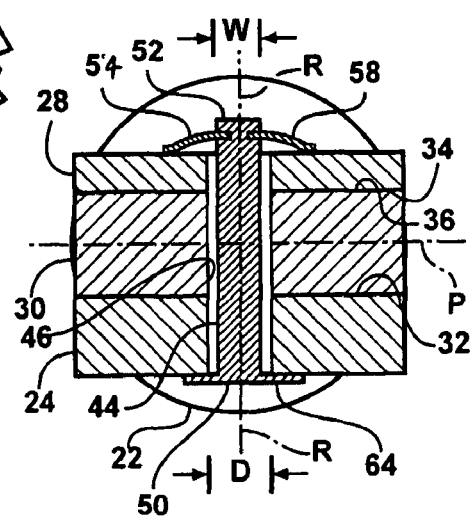
FIG. 6 is a cross sectional view of the second embodiment of the shaft assembly along cut line 6-6 shown in FIG. 5.

Referring to FIGS. 1 through 4, the shaft assembly 20 includes a first shaft 22 having an output end 24. The output end 24 includes a rectangular cross section, as best seen in FIGS. 1, 4 and 6. The size of the output end 24 may vary depending on the type of use anticipated for the shaft assembly 20 and the torque transmitted by the shaft assembly 20. It should be appreciated that while the output end 24 of the first shaft 22 includes the rectangular cross section, the rest of the first shaft 22 may include some other cross sectional shape suitable for the intended use of the shaft assembly 20. For example, the first shaft 22 may include the output end 24 having the rectangular cross section, while the rest of the first shaft 22 includes a circular cross section suitable for being rotationally supported by a bracket.

The shaft assembly 20 further includes a second shaft 26 having an input end 28. The input end 28 partially overlaps the output end 24 of the first shaft 22. The output end 24 and the input end 28 each include opposing planar surfaces. As shown, the input end 28 includes a rectangular cross section opposing the rectangular cross section of the output end 24, as best shown in FIGS. 1, 4 and 6. The size of the input end 28 may vary depending on the type of use anticipated for the shaft assembly 20 and the torque transmitted by the shaft assembly 20. It should be appreciated that while the input end 28 of the second shaft 26 includes the rectangular cross section, the rest of the second shaft 26 may include some other cross sectional shape suitable for the intended use of the shaft assembly 20. For example, the second shaft 26 may include the input end 28 having the rectangular cross section, while the rest of the second shaft 26 includes a circular cross section suitable for being rotationally supported by a bracket.

As best shown in FIG. 3, a pivot block 30 is disposed between, i.e., is sandwiched between the output end 24 of the first shaft 22 and the input end 28 of the second shaft 26. The pivot block 30 defines a pivot axis P about which the first shaft 22 and the second shaft 26 pivot relative to each other.

The pivot block 30 includes a mounting surface 32, which is disposed against one of the output end 24 and the input end 28. The pivot block 30 further includes a semi-annular surface 34, opposing the mounting surface 32, and disposed against the other of the input end 28 and the output end 24. The semi-annular surface 34 facilitates the pivotal movement of the first shaft 22 relative to the second shaft 26. In other words, the pivot block 30 includes the mounting surface 32 disposed against one of the input end 28 and the output end 24, and further includes the semi-annular surface 34 disposed against the other of the input end 28 and the output end 24. It should therefore be appreciated that the pivot block 30 defines the mounting surface 32 on one side and the semi-annular surface 34 on another side opposing the mounting surface 32, disposed 180° about the pivot axis P relative to the mounting surface 32. It should also be appreciated that the mounting surface 32 and the semi-annular surface 34 may be disposed against either the input end 28 or the output end 24.

Preferably, the mounting surface 32 includes a smooth or flat planar surface to facilitate the rotational movement between the pivot block 30 and the one of the input end 28 and the output end 24 disposed against the mounting surface 32 as will be described below. However, the mounting surface 32 may also include a roughened surface to increase the resistance to rotation between the mounting surface 32 and the one of the input end 28 and the output end 24.

Preferably, the other of the output end 24 and the input end 28 disposed against the semi-annular surface 34 of the pivot block 30 defines a concave recess 36. The concave recess 36 is complimentary in shape to the semi-annular surface 34 of the pivot block 30 for engaging the semi-annular surface 34. The concave recess 36 supports the semi-annular surface 34 of the pivot block 30 to guide the pivotal movement between the first shaft 22 and the second shaft 26.

Figure 5:
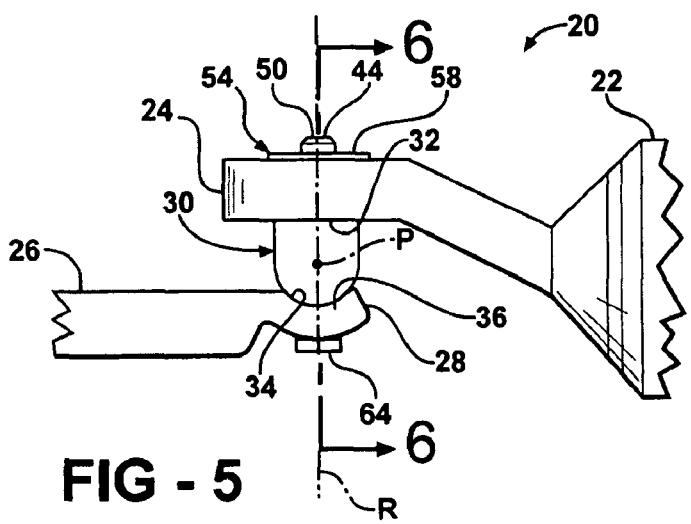
FIG. 5 is an enlarged fragmentary side view of a second embodiment of the shaft assembly.

In the embodiment shown in FIGS. 1 through 4, the pivot block 30 includes a shoe 38. The shoe 38 defines the mounting surface 32, and further defines a semi-circular groove 40. A pivot pin 42, having a circular cross section defining the semi-annular surface 34, is disposed between the semi-circular groove 40 defined by the shoe 38 and the concave recess 36 defined by the one of the input end 28 and the output end 24. It should be appreciated that the pivot pin 42 may include a solid rod, a cylindrical tube, or may be formed from flat stock rolled to have a circular cross section. Alternatively, referring to the embodiment shown in FIGS. 5 and 6, the pivot block 30 may include a single uniform block defining the mounting surface 32 and the semi-annular surface 34.

As best shown in FIG. 4, a fastener 44 interconnects the output end 24, the pivot block 30 and the input end 28. The fastener 44 defines a rotational axis R, which is transverse to and intersects the pivot axis P. The first shaft 22 and the second shaft 26 rotate relative to each other about the rotational axis R. Accordingly, the first shaft 22 and the second shaft 26 move relative to each other about a point defined by the intersection of the pivot axis P and the rotational axis R.

The output end 24, the pivot block 30 and the input end 28 cooperate to define a concentric bore 46, which extends through the output end 24, the pivot block 30 and the input end 28. The fastener 44 extends through the bore 46. The fastener 44 includes a width W, and the bore 46 defines a diameter D greater than the width W of the fastener 44 to permit the pivotal movement between the first shaft 22 and the second shaft 26. The diameter D of the bore 46 must be sufficiently large relative to the width W of the fastener 44 to accommodate the pivotal movement between the first shaft 22 and the second shaft 26. In other words, a larger difference between the diameter D of the bore 46 and the width W of the fastener 44 permits a larger range of pivotal movement between the first shaft 22 and the second shaft 26. It should be appreciated, that the diameter D of the bore 46 may vary, so that the difference between the diameter D of the bore 46 and the width W of the fastener 44 in the first shaft 22 is different than the difference between the diameter D of the bore 46 and the width W of the fastener in the pivot block 30 or the second shaft 26. It should also be appreciated that the bore 46 may define an elongated slot, permitting a range of motion in substantially only one direction.

The fastener 44 includes a first end having a head 50 attached to the first end, and further includes a second end 52 having a spring 54 attached to the second end 52. The spring 54 biases the output end 24, the pivot block 30 and the input end 28 together against the head 50, thereby sandwiching the shaft assembly 20 together to de-lash the shaft assembly 20.

Referring to FIG. 4, the spring 54 includes at least one spring arm 56 extending from the fastener 44 transverse to the bore 46. Preferably, the spring 54 includes a pair of spring arms 56 extending across the bore 46 opposite each other. Alternatively, as shown in FIG. 6, the spring 54 may include a bowed e-clip 58 coupled to the fastener 44. The torsional stiffness of the bipot joint created by the interaction of the input end 28, the pivot block 30, the output end 24 and the fastener 44 is dependent upon the biasing force supplied by the spring 54. The higher the biasing force supplied by the spring 54, the higher the torsional stiffness is. It should be appreciated that the spring 54 may include some other configuration or type of spring 54 not specifically described or shown herein, so long as the spring 54 biases the input end 28, the pivot block 30 and the output end 24 together to de-lash the shaft assembly 20.

Referring to FIG. 4, the head 50 defines an aperture 60 and further includes a retaining pin 62 extending through the aperture 60. The retaining pin 62 includes a length greater than the diameter D of the bore 46. Accordingly, the retaining pin 62 spans across the bore 46, and supplies the resistance to which the spring 54 acts to bias the shaft assembly 20 together. Alternatively, as shown in FIG. 6, the head 50 may include a cap 64 defining a contact surface greater than the diameter D of the bore 46, i.e., the fastener 44 may include a cap 64 formed or fixedly attached thereto and having an area larger than the diameter D of the bore 46 to cover the bore 46. It should be appreciated that the head 50 of the fastener 44 may include other configurations preventing axial movement of the fastener 44 within the bore 46 along the rotational axis R.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A shaft assembly comprising:

a first shaft having an output end;

a second shaft having an input end partially overlapping said output end of said first shaft;

a pivot block disposed between said output end of said first shaft and said input end of said second shaft and defining a pivot axis about which said first shaft and said second shaft pivot relative to each other;

said pivot block including a mounting surface disposed against one of said output end and said input end and further including a semi-annular peripheral surface opposing said mounting surface and concentric with said pivot axis disposed against the other of said input end and said output end for facilitating pivotal movement of said first shaft relative to said second shaft, said pivot block comprising a pivot pin longitudinally extending along said pivot axis and having a cross-section defining said semi-annular surface, and said pivot block further comprising a shoe comprising said mounting surface and having a semi-circular groove surface opposing said mounting surface and longitudinally extending along said pivot axis, a peripheral surface of said pivot pin opposing said semi-annular surface disposed within said semi-circular groove surface and said semi-annular surface pivotably engaging said other of said input end and said output end; and a fastener rotatably connecting said output end, said pivot block and said input end, said fastener defining a rotational axis transversely extending through said pivot axis about which said first shaft and said second shaft rotate relative to each other, wherein said output end, said pivot pin, said shoe and said input end cooperate to define a longitudinal bore transversely extending through said output end, said pivot pin, said shoe and said input end with said fastener extending through said bore.

2. A shaft assembly as set forth in claim 1 wherein said fastener includes a width and said bore defines a diameter greater than said width to permit said pivotal movement between said first shaft and said second shaft relative to said fastener.

3. A shaft assembly as set forth in claim 2 wherein said diameter of said bore in one of said input end and said output end is larger than said diameter of said bore in the other of said input end and said output end.

4. A shaft assembly as set forth in claim 2 wherein said fastener includes a first end having a head attached to said first end and further includes a second end having a spring attached to said second end to bias said output end, said pivot block and said input end together against said head.

5. A shaft assembly as set forth in claim 4 wherein said spring includes a bowed e-clip coupled to said fastener.

6. A shaft assembly as set forth in claim 5 wherein said head includes a cap defining a contact surface greater than said diameter of said bore.

7. A shaft assembly as set forth in claim 4 wherein said spring includes at least one spring arm extending from said fastener transverse to said bore.

8. A shaft assembly as set forth in claim 7 wherein said head defines an aperture and further includes a retaining pin extending through said aperture and having a length greater than said diameter of said bore.

9. A shaft assembly as set forth in claim 1 wherein said output end and said input end each include opposing planar surfaces parallel to said pivot axis.

10. A shaft assembly as set forth in claim 9 wherein said output end includes a rectangular cross section.

11. A shaft assembly as set forth in claim 10 wherein said input end includes a rectangular cross section.

12. A shaft assembly as set forth in claim 1 wherein said mounting surface includes a planar surface.

13. A shaft assembly as set forth in claim 1 wherein the other of said output end and said input end disposed against said semi-annular surface of said pivot block defines a concave recess complimentary in shape to said semi-annular surface of said pivot block for engaging said semi-annular surface therein.

* * * * *